(12) United States Patent
Kishioka et al.

(10) Patent No.: US 8,551,615 B2
(45) Date of Patent: *Oct. 8, 2013

(54) PRESSURE SENSITIVE ADHESIVE COMPOSITION, PRODUCT USING THE SAME, AND DISPLAY USING THE PRODUCT

(75) Inventors: Hiroaki Kishioka, Ibaraki (JP); Ryuuichi Kabutoya, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 662 days.

This patent is subject to a terminal disclaimer.

(21) Appl. No.: 12/230,658

(22) Filed: Sep. 3, 2008

(65) Prior Publication Data

US 2009/0068459 A1    Mar. 12, 2009

(30) Foreign Application Priority Data

Sep. 6, 2007   (JP) ................... 2007-232001
Apr. 16, 2008  (JP) ................... 2008-106910

(51) Int. Cl.
*B32B 7/12*    (2006.01)

(52) U.S. Cl.
USPC ............. 428/355 EN; 428/355 CN; 526/318; 525/123

(58) Field of Classification Search
USPC .................. 428/355 CN, 355 EN; 526/318; 525/123
See application file for complete search history.

(56) References Cited

U.S. PATENT DOCUMENTS

| | | | |
|---|---|---|---|
| 5,864,801 A | | 1/1999 | Sugiyama et al. |
| 5,940,104 A | * | 8/1999 | Karita et al. ................... 347/87 |
| 6,448,339 B1 | | 9/2002 | Tomita et al. |
| 2005/0175833 A1 | * | 8/2005 | Yoneda ..................... 428/355 R |
| 2006/0159915 A1 | * | 7/2006 | Chang et al. ............ 428/355 AC |
| 2008/0214079 A1 | * | 9/2008 | Harai et al. .................. 442/151 |
| 2009/0110849 A1 | | 4/2009 | Nishina |
| 2010/0080991 A1 | * | 4/2010 | Kishioka et al. .......... 428/355 R |

FOREIGN PATENT DOCUMENTS

| | | |
|---|---|---|
| EP | 0456840 | 11/1991 |
| EP | 1820834 | 8/2007 |
| EP | 1881046 | 1/2008 |
| EP | 1894982 | 3/2008 |
| JP | 3516035 | 11/1998 |
| JP | 2000-169825 A | 6/2000 |
| JP | 2001-089731 | 4/2001 |
| JP | 2001-123136 A | 5/2001 |
| JP | 2002-327160 | 11/2002 |
| JP | 2005-325250 A | 11/2005 |
| JP | 2006-291027 A | 10/2006 |
| JP | 2006-342191 A | 12/2006 |
| JP | 2007-138057 A | 6/2007 |
| WO | WO-00/34405 A1 | 6/2000 |
| WO | WO-2007-034533 A1 | 3/2007 |

OTHER PUBLICATIONS

Database WPI Week 200061, Thomson Scientific, London, GB; AN 2000-630693, English abstract of JP2000-212526; Aug. 2, 2000 (3 pages).
European Search Report dated May 20, 2009, issued on the counterpart European patent application No. 08015492.5.
Notification of Reason for Refusal mailed Oct. 20, 2009, issued on the Japanese Patent Application No. 2008-106910.
Office Action for U.S. Appl. No. 11/481,941 dated Oct. 7, 2010.

* cited by examiner

*Primary Examiner* — Hai Vo
(74) *Attorney, Agent, or Firm* — Edwards Wildman Palmer LLP; James E. Armstrong, IV

(57) ABSTRACT

Disclosed is a pressure-sensitive adhesive composition which contains an acrylic polymer and a crosslinking agent. The acrylic polymer has a weight-average molecular weight of $40 \times 10^4$ to $160 \times 10^4$ and contains at least an alkoxyalkyl acrylate (Component A) and an acrylic monomer having a crosslinkable functional group (Component B). The monomer components constituting the acrylic polymer contain 45 to 99.5 parts by weight of Component A and 0.5 to 4.5 parts by weight of Component B to 100 parts by weight of total monomer components constituting the acrylic polymer, and the monomer components constituting the acrylic polymer contain substantially no carboxyl-containing monomers. This relates to improvements to provide pressure-sensitive adhesive compositions that show excellent coatability, transparency, adhesion (typically low-temperature adhesion), and resistance to blistering/separation and concurrently have anti-corrosive properties.

10 Claims, 6 Drawing Sheets

(2a)                  (2b)

PRESSURE SENSITIVE ADHESIVE COMPOSITION, PRODUCT USING THE SAME, AND DISPLAY USING THE PRODUCT

BACKGROUND OF THE INVENTION

1. Field of the Invention

The present invention relates to acrylic pressure-sensitive adhesive compositions. Specifically, it relates to pressure-sensitive adhesive compositions that excel in adhesiveness to glass and transparent plastics such as polyacrylates, polycarbonates, poly(ethylene terephthalate)s (PETs), resistance to blistering/separation, transparency, and coatability and do not cause corrosion typically on thin metal films. Additionally, it relates to pressure-sensitive adhesive articles bearing the pressure-sensitive adhesive compositions, and displays as affixed using the pressure-sensitive adhesive articles.

2. Description of the Related Art

Flat panel displays (FPDs) typified by liquid crystal displays (LCDs) have been used more and more. Such flat panel displays are fabricated by laminating optical films having various functions through pressure-sensitive adhesives (tacky adhesives). Pressure sensitive adhesives for use in these applications should have excellent reliabilities in addition to satisfactory adhesiveness and transparency. Typically, they should suffer from no blister and separation (have resistance to blistering/separation) under conditions at high temperatures and/or high humidity (high-temperature/high-humidity conditions).

Exemplary known techniques for improving the resistance of pressure-sensitive adhesives to blistering/separation under conditions at high temperatures and/or high humidity include techniques of allowing the pressure-sensitive adhesives to have higher glass transition temperatures (Tg) typically by copolymerizing with monomers whose homopolymers have high glass transition temperatures (Tg) (monomers having high glass transition temperatures (Tg)) or with monomers containing a functional group such as carboxyl group; and by adding oligomers (low-molecular-weight polymers) thereto.

Typically, Japanese Patent No. 3516035 discloses a pressure-sensitive adhesive composition which contains a polymer including a carboxyl-containing monomer as a component; and an oligomer including an amino-containing monomer as a component and which excels in adhesiveness to plastics and in resistance to blistering at room temperature (ordinary temperature) and at high temperatures. Japanese Unexamined Patent Application Publication (JP-A) No. 2001-89731 discloses a pressure-sensitive adhesive composition which contains a (meth)acrylate polymer (A) having a weight-average molecular weight of $50 \times 10^4$ to $250 \times 10^4$ and another (meth)acrylate polymer (B) having a weight-average molecular weight of 5000 to $50 \times 10^4$ in a specific weight ratio, in which one of the (meth)acrylate polymers (A) and (B) has a nitrogen-containing functional group. Additionally, JP-A No. 2002-327160 discloses a pressure-sensitive adhesive composition which contains 100 parts by weight of a pressure-sensitive adhesive polymer as a copolymer of an alkoxyalkyl (meth)acrylate as a main component and a carboxyl-containing monomer; 5 to 40 parts by weight of a low-molecular-weight polymer as a copolymer of one or more monomers, as main components, selected from alkyl methacrylates, cycloalkyl methacrylates, benzyl methacrylate, and styrene with an amino-containing or amido-containing monomer; and 0.001 to 2.0 parts by weight of a crosslinking agent. This document also discloses a pressure-sensitive adhesive sheet using the pressure-sensitive adhesive composition.

These pressure-sensitive adhesive compositions, however, suffer from insufficient adhesive properties at low temperatures or under high-speed conditions, because their pressure-sensitive adhesives have high glass transition temperatures (Tg). Among them, the pressure-sensitive adhesive composition containing a carboxyl-containing monomer suffers from insufficient anticorrosive properties when it is applied to thin metal films (inclusive of thin metal oxide films). Specifically, there has been obtained no pressure-sensitive adhesive composition which is excellent and satisfactorily has all characteristic properties such as resistance to blistering/separation under conditions at high temperatures and/or high humidity, adhesive properties at low temperatures, and anticorrosive properties at high levels.

SUMMARY OF THE INVENTION

Accordingly, an object of the present invention is to provide a pressure-sensitive adhesive composition that excels in coatability, adhesiveness, transparency, and resistance to blistering/separation and simultaneously excels in anticorrosive properties; as well as to provide a pressure-sensitive adhesive article and a display both of which use the pressure-sensitive composition and thereby have high reliability.

On the other hand, pressure-sensitive adhesives for use in some applications should be highly resistant to yellowing. Yellowing may occur, for example, when pressure-sensitive adhesives use aromatic isocyanate compounds as crosslinking agents. To avoid yellowing, it is effective to use aliphatic isocyanate crosslinking agents. In this case, however, crosslinking may proceed very slowly to cause problems in productivity. Although it is possible to accelerate crosslinking reactions by heating in regular pressure-sensitive adhesive sheets, such heating for the acceleration of crosslinking is liable to cause and promote nicks (indentation) and is thereby unsuitable to employ in display uses, because severe requirements upon appearance are set in these uses.

Accordingly, another object of the present invention is to provide a pressure-sensitive adhesive composition that excels in yellowing resistance and productivity, in addition to the above properties; as well as to provide a pressure-sensitive adhesive article and a display both of which use the pressure-sensitive composition.

After intensive investigations to achieve the above objects, the present inventors have found that, by allowing an acrylic polymer containing an alkoxyalkyl acrylate as a main monomer component and having a specific molecular weight to have a crosslinking structure, a pressure-sensitive adhesive composition that has satisfactory resistance to blistering/separation at high temperatures can be obtained even containing no carboxyl-containing monomer component such as acrylic acid.

They have further found that use of an aliphatic isocyanate crosslinking agent and an amine compound containing two or more hydroxyl groups in specific amounts gives a pressure-sensitive adhesive composition that is prevented from yellowing and excels in productivity without carrying out heating for the acceleration of crosslinking. The present invention has been made based on these findings.

Specifically, according to an embodiment of the present invention, there is provided a pressure-sensitive adhesive composition which includes an acrylic polymer, and a crosslinking agent, wherein acrylic polymer has a weight-average molecular weight of $40 \times 10^4$ to $160 \times 10^4$ and contains at least one alkoxyalkyl acrylate (Component A) and at least one acrylic monomer having a crosslinkable functional group (Component B) as essential monomer components, in which the monomer components constituting the acrylic polymer contain 45 to 99.5 parts by weight of Component A and 0.5 to 4.5 parts by weight of Component B to 100 parts by weight of total monomer components constituting the acrylic polymer, and the monomer components constituting the acrylic polymer contain substantially no carboxyl-containing monomers.

The pressure-sensitive adhesive composition having the above configuration excels in coatability, adhesiveness (typified by adhesive properties at low temperatures), transparency, and resistance to blistering/separation, and, if used for bonding of optical members typically in displays, helps to improve optical properties such as viewability of these articles. Additionally, the pressure-sensitive adhesive composition does not cause corrosion of thin metal films (inclusive of thin metal oxide films) and is usable even in a portion where a film bearing a thin metal film such as ITO (indium tin oxide) film is to be adhered and laminated.

In an embodiment, the pressure-sensitive adhesive composition may contain 100 parts by weight of an acrylic polymer; 0.01 to 3.0 parts by weight of an aliphatic isocyanate crosslinking agent; and 0.01 to 5.0 parts by weight of an amine compound containing two or more hydroxyl groups, which acrylic polymer has a weight-average molecular weight of $40 \times 10^4$ to $160 \times 10^4$ and contains at least one alkoxyalkyl acrylate (Component A) and at least one acrylic monomer having a crosslinkable functional group (Component B) as essential monomer components, in which the monomer components constituting the acrylic polymer contain 45 to 99.5 parts by weight of Component A and 0.5 to 4.5 parts by weight of Component B to 100 parts by weight of total monomer components constituting the acrylic polymer, and the monomer components constituting the acrylic polymer contain substantially no carboxyl-containing monomers.

Use of specific amounts of an aliphatic isocyanate crosslinking agent and an amine compound containing two or more hydroxyl groups as above helps the pressure-sensitive adhesive composition to be resistant to yellowing and excellent in productivity without carrying out heating for the acceleration of crosslinking. The resulting pressure-sensitive adhesive composition is usable even in applications severely requiring these properties.

Component B may include a hydroxyl-containing acrylic monomer.

A crosslinked product of the pressure-sensitive adhesive composition may have a gel fraction of 40% to 80%.

According to another embodiment of the present invention, there is provided a pressure-sensitive adhesive article which is applied with the pressure-sensitive adhesive composition.

According to yet another embodiment of the present invention, there is provided a display using the pressure-sensitive adhesive article.

These and other objects, features, and advantages of the present invention will be more fully understood from the following description of preferred embodiments with reference to the attached drawings. All numbers are herein assumed to be modified by the term "about."

DESCRIPTION OF THE PREFERRED EMBODIMENTS

[Pressure-Sensitive Adhesive Composition]

Figure 1:
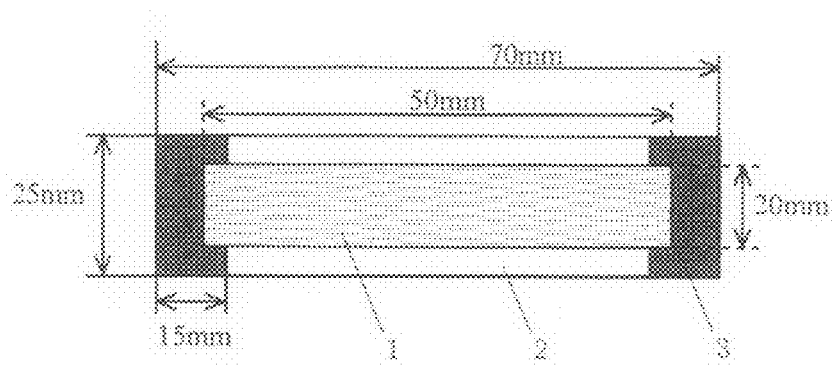
FIG. 1 is a schematic view of a test sample for use in determination of anticorrosive properties in Examples below.

Pressure-sensitive adhesive compositions according to embodiments of the present invention include an acrylic polymer and a crosslinking agent as essential components.

Acrylic polymers for use in the pressure-sensitive adhesive compositions are polymers each containing an alkoxyalkyl ester of acrylic acid (alkoxyalkyl acrylate) (hereinafter also referred to as "Component A") as a main monomer component. The polymers further contain an acrylic monomer having a crosslinkable functional group (except for carboxyl groups) (hereinafter also referred to as "Component B") as an essential copolymerizable monomer component, in addition to the main monomer component (Component A). They may further contain any other monomer components. It should be noted that the acrylic polymers contain substantially no carboxy-containing monomers as monomer components.

Exemplary alkoxyalkyl acrylates (Components A) include, but are not limited to, 2-methoxyethyl acrylate, 2-ethoxyethyl acrylate, methoxytriethylene glycol acrylate, 3-methoxypropyl acrylate, 3-ethoxypropyl acrylate, 4-methoxybutyl acrylate, and 4-ethoxybutyl acrylate. Each of different Components A may be used alone or in combination.

The monomeric content of Component A as a main monomer component in the acrylic polymer is 45 to 99.5 parts by weight and preferably 50 to 80 parts by weight, to 100 parts by weight of total monomer components. If the content of Component A in the total monomer components is less than 45 parts by weight, the pressure-sensitive adhesive composition may have insufficient resistance to blistering/separation. In contrast, if it exceeds 99.5 parts by weight, the acrylic polymer contains Component B in an insufficient amount to thereby have an insufficient crosslinking structure, and this may impair the resistance to blistering/separation. As used herein a "monomeric content" refers to a charging ratio (blending ratio) of a monomer component for the preparation of an acrylic polymer. Other monomeric contents regarding other monomers are defined as above.

The crosslinkable functional group in the acrylic monomer having a crosslinkable functional group (Component B) is not particularly limited, as long as it is a functional group other than carboxyl group and is capable of crosslinking with a crosslinking agent as mentioned later. Exemplary crosslinkable functional groups include glycidyl group, amino group, N-methylolamido group, and hydroxyl group. Specific exemplary Components B include monomers having a glycidyl group, such as glycidyl (meth)acrylates and glycidyl methyl (meth)acrylates; monomers having an amino group, such as N,N-dimethylaminoethyl (meth)acrylates and N,N-diethylaminoethyl (meth)acrylates; monomers having a N-methylolamido group, such as N-methylolacrylamide; and monomers having a hydroxyl group, such as 2-hydroxyethyl (meth) acrylates, 3-hydroxypropyl (meth)acrylates, 4-hydroxybutyl (meth)acrylates, and 6-hydroxyhexyl (meth)acrylates. Among them, N-methylolamido-containing monomers and hydroxyl-containing acrylic monomers are preferred, of which hydroxyl-containing acrylic monomers are more preferred; and 2-hydroxyethyl acrylate (2HEA), 4-hydroxybutyl acrylate (4HBA), 3-hydroxypropyl acrylate (3HPA), and 6-hydroxyhexyl acrylate (6HHA) are further preferred. As used herein the term "(meth)acrylic" means "acrylic" and/or "methacrylic". The followings are defined in the same way.

The monomeric content of Component B in the acrylic polymer is, for example, 0.5 to 4.5 parts by weight, preferably 0.5 to 3.0 parts by weight, and more preferably 0.5 to 2.0 parts by weight, to 100 parts by weight of total monomer components. If the monomeric content of Component B in the total monomer components is less than 0.5 part by weight, Component B may not sufficiently help to form a crosslinking structure of the polymer, and this may invite blistering. In contrast, if it exceeds 4.5 parts by weight, the polymer may have an excessively dense crosslinking structure, and this may often cause separation (peeling).

The acrylic polymer contains substantially no carboxyl-containing monomers as monomer components. As used herein the term "contains substantially no" means that such component is not actively incorporated, except for inevitable contamination. Specifically, the content of carboxyl-containing monomers is, for example, less than 0.05 pars by weight, preferably less than 0.01 part by weight, and more preferably less than 0.001 part by weight, to 100 parts by weight of total monomer components. Such carboxyl-containing monomers, if contained, may adversely affect anticorrosive properties with respect to thin metal films and may cause insufficient electroconductivity typically of ITO films. Exemplary carboxyl-containing monomers include acrylic acid (AA), methacrylic acid, itaconic acid, maleic acid, fumaric acid, and crotonic acid. Such carboxyl-containing monomers herein also include acid anhydrides of these carboxyl-containing monomers, including acid anhydride-containing monomers such as maleic anhydride and itaconic anhydride.

Exemplary other monomer components than Components A and B in acrylic polymers include alkyl (meth)acrylates whose alkyl moiety has one to twelve carbon atoms, such as methyl (meth)acrylates, ethyl (meth)acrylates, n-butyl (meth) acrylates, isobutyl (meth)acrylates, sec-butyl (meth)acrylates, t-butyl (meth)acrylates, pentyl (meth)acrylates, isopentyl (meth)acrylates, neopentyl (meth)acrylates, hexyl (meth) acrylates, heptyl (meth)acrylates, octyl (meth)acrylates, isooctyl (meth)acrylates, 2-ethylhexyl (meth)acrylates, nonyl (meth)acrylates, isononyl (meth)acrylates, decyl (meth)acrylates, isodecyl (meth)acrylates, undecyl (meth)acrylates, and dodecyl (meth)acrylates; as well as alkoxyalkyl methacrylates such as methoxyethyl methacrylate and ethoxyethyl methacrylate; polyfunctional monomers such as triethylene glycol diacrylate, ethylene glycol dimethacrylate, and trimethylolpropane tri(meth)acrylates; and other monomers such as vinyl acetate, styrene, and cyclohexyl (meth)acrylates.

Of the other monomer components, monomers having a glass transition temperature (Tg) as a homopolymer of 0° C. or lower are preferred, and those having a glass transition temperature (Tg) as a homopolymer of −40° C. or lower are more preferred, from the viewpoint of yielding a low glass transition temperature (Tg) of the acrylic polymer. Typically, 2-ethylhexyl acrylate (2EHA) and butyl acrylate (BA) are preferred.

Such acrylic polymers can be prepared according to known or common polymerization techniques. Exemplary polymerization techniques for the acrylic polymers include solution polymerization, emulsion polymerization, bulk polymerization, and polymerization through application of ultraviolet rays (ultraviolet polymerization). Among them, solution polymerization and ultraviolet polymerization are preferred, of which solution polymerization is more preferred, from the viewpoints typically of providing satisfactory transparency and water resistance with low cost.

Polymerization initiators for use in solution polymerization of the acrylic polymers are not particularly limited and may be suitably selected from among known or common polymerization initiators. Exemplary preferred polymerization initiators include oil-soluble polymerization initiators including azo polymerization initiators such as 2,2'-azobisisobutyronitrile, 2,2'-azobis(4-methoxy-2,4-dimethylvaleronitrile), 2,2'-azobis(2,4'-dimethylvaleronitrile), 2,2'-azobis (2-methylbutyronitrile), 1,1'-azobis(cyclohexane-1-carbonitrile), 2,2'-azobis(2,4,4-trimethylpentane), and dimethyl 2,2'-azobis(2-methylpropionate); peroxide polymerization initiators such as benzoyl peroxide, t-butyl hydroperoxide, di-t-butyl peroxide, t-butyl peroxybenzoate, dicumyl peroxide, 1,1-bis(t-butylperoxy)-3,3,5-trimethylcyclohexane, and 1,1-bis(t-butylperoxy)cyclododecane. Each of different polymerization initiators may be used alone or in combination. The amount of polymerization initiators has only to be a common or regular amount and is, for example, within a range of 0.01 to 1 part by weigh to 100 parts by weight of total monomer components.

The solution polymerization may be conducted in a common solvent. Exemplary solvents include organic solvents including esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methyl ethyl ketone and methyl isobutyl ketone. Each of different solvents may be used alone or in combination.

The weight-average molecular weight (hereinafter also simply referred to as "molecular weight,") of the acrylic polymers is, for example, $40 \times 10^4$ or more and $160 \times 10^4$ or less ($40 \times 10^4$ to $160 \times 10^4$), preferably $60 \times 10^4$ to $120 \times 10^4$, and more preferably $60 \times 10^4$ to $100 \times 10^4$. An acrylic polymer having a weight-average molecular weight of less than $40 \times 10^4$ may not help to provide sufficient adhesive force and cohesive force as a pressure-sensitive adhesive, and the resulting pressure-sensitive adhesive may have insufficient resistance to blistering/separation. In contrast, an acrylic polymer having a weight-average molecular weight of more than $160 \times 10^4$ may cause insufficient coatability due to an excessively increased viscosity of the pressure-sensitive adhesive composition.

The weight-average molecular weight (Mw) may be determined according to gel permeation chromatography (GPC). More specifically, the weight-average molecular weight may be determined by carrying out gel permeation chromatography calibrated with standard polystyrenes under the following conditions with a gel permeation chromatography system supplied by Tosoh Corporation under the trade name of "HLC-8120 GPC".

Conditions for Gel Permeation Chromatography
Sample concentration: 0.2 percent by weight (tetrahydrofuran solution)
Sample amount: 10 µl
Eluent: tetrahydrofuran (THF)
Flow rate: 0.6 mL/min
Column temperature (measurement temperature): 40° C.
Column: "TSK gel Super HM-H/H4000/H3000/H2000" (trade name, supplied by Tosoh Corporation)
Detector: differential refractive index detector (RI)

The weight-average molecular weight of an acrylic polymer may be controlled by adjusting conditions and parameters such as the type and amount of the polymerization initiator, the temperature and duration of polymerization, the monomer concentrations, and the dropping rates (adding rates) of monomers.

The glass transition temperature (Tg) of the acrylic polymer is preferably −40° C. to −70° C., and more preferably −50° C. to −70° C., for improving adhesive properties at low temperatures and properties at high speed such as drop impact resistance which is resistance against separation or peeling when an adhered assembly is dropped. As used herein the "glass transition temperature (Tg)" of an acrylic polymer is a glass transition temperature (theoretical value) represented by the following equation:

$$1/Tg = W_1/Tg_1 + W_2/Tg_2 + \ldots + W_n/Tg_n$$

wherein Tg represents the glass transition temperature (unit: K) of the acrylic polymer; $Tg_n$ represents the glass transition temperature (unit: K) of a homopolymer of a monomer "n"; and $W_n$ represents the weight fraction of the monomer "n".

The acrylic polymer has a storage elastic modulus at 80° C. of preferably 0.01 MPa or more, and more preferably 0.03 MPa or more. The storage elastic modulus herein is determined by stacking pressure-sensitive adhesive layers to a thickness of about 1.5 mm and measuring the storage elastic modulus of the laminate at a frequency of 1 Hz with the "Advanced Rheometric Expansion System (ARES)" supplied by Rheometric Scientific. The measurement is conducted at temperatures ranging from −70° C. to 200° C. at a temperature elevation rate of 5° C./minute.

A wide variety of known crosslinking agents may be used in the pressure-sensitive adhesive compositions. Such crosslinking agents may be suitably selected typically from polyfunctional melamine compounds, polyfunctional epoxy compounds, and polyfunctional isocyanate compounds, according typically to the type of the functional group of Component B. Each of different crosslinking agents may be used alone or in combination. Use of crosslinking agents herein helps to form a crosslinking structure of the polymer, and this helps to provide suitably balanced resistance to blistering/separation.

Exemplary polyfunctional melamine compounds include methylated trimethylolmelamine and butylated hexamethylolmelamine. Exemplary polyfunctional epoxy compounds include diglycidyl aniline and glycerol diglycidyl ether. Exemplary polyfunctional isocyanate compounds include tolylene diisocyanate (TDI), hexamethylene diisocyanate (HDI), polymethylene polyphenyl isocyanate, diphenylmethane diisocyanate, reaction products between trimethylolpropane and tolylene diisocyanate, polyether polyisocyanates, and polyester polyisocyanates. In a preferred embodiment, a hydroxyl-containing monomer and a polyfunctional isocyanate compound (isocyanate crosslinking agent) are used in combination as Component B and the crosslinking agent, respectively.

Of the above crosslinking agents, aliphatic isocyanate crosslinking agents are preferred as crosslinking agents, for improving yellowing resistance (inhibition of yellowing). Exemplary aliphatic isocyanate crosslinking agents include a wide variety of known ones, of which preferred are 1,6-hexamethylene diisocyanate, 1,4-tetramethylene diisocyanate, 2-methyl-1,5-pentane diisocyanate, 3-methyl-1,5-pentane diisocyanate, lysine diisocyanate, isophorone diisocyanate, cyclohexyl diisocyanate, hydrogenated tolylene diisocyanate, hydrogenated xylene diisocyanate, hydrogenated diphenylmethane diisocyanate, and hydrogenated tetramethylxylene diisocyanate. In another preferred embodiment, a hydroxyl-containing monomer and hexamethylene diisocyanate (1,6-hexamethylene diisocyanate; HDI) and/or a reaction product of HDI are used in combination as Component B and the crosslinking agent, respectively.

The amount of crosslinking agents is not particularly limited but is generally preferably 0.01 to 5 parts by weight, more preferably 0.01 to 3 parts by weight, further preferably 0.1 to 3 parts by weight, and especially preferably 0.1 to 1.0 part by weight, typically to 100 parts by weight of the acrylic polymer.

A pressure-sensitive adhesive composition according to an embodiment of the present invention further contains an amine compound containing two or more hydroxyl groups, for accelerating the crosslinking reaction. The amine compound is especially preferably used when an aliphatic isocyanate crosslinking agent is used as the crosslinking agent, so as to allow the crosslinking reaction to proceed rapidly without acceleration by heating, to thereby give satisfactory productivity. The amine compound containing two or more hydroxyl groups can be any amine compound having at least two hydroxyl groups (alcoholic hydroxyl groups) per molecule. The number of nitrogen atoms of the amine compound per molecule is not particularly limited. Each of different amine compounds containing two or more hydroxyl groups may be used alone or in combination.

Specific exemplary amine compounds containing two or more hydroxyl groups include amine compounds each having one nitrogen atom per molecule, including di(alcohol)amines such as diethanolamine, dipropanolamine, diisopropanolamine, N-methyldiethanolamine, N-methyldiisopropanolamine, N-ethyldiethanolamine, N-ethyldiisopropanolamine, N-butyldiethanolamine, and N-butyldiisopropanolamine; and tri(alcohol)amines such as triethanolamine, tripropanolamine, and triisopropanolamine.

Exemplary amine compounds further include amine compounds having two nitrogen atoms per molecule, such as amine compounds represented by following Formula (I):

wherein $R^1$, $R^2$, $R^3$, and $R^4$ are the same as or different from one another and each represent a hydrogen atom or [—$(R^5O)_m(R^6O)_n$—H], wherein $R^5$ and $R^6$ are different from each other and each represent an alkylene group; "m" and "n" are each an integer of 0 or more and are not concurrently 0 (zero), where at least two of $R^1$, $R^2$, $R^3$, and $R^4$ are [—$(R^5O)_m(R^6O)_n$—H]; X represents a divalent hydrocarbon group; and "p" is an integer of 1 or more.

In Formula (I), exemplary alkylene groups as $R^5$ and $R^6$ include alkylene groups having about one to six carbon atoms, such as methylene, ethylene, propylene, trimethylene, tetramethylene, ethylethylene, pentamethylene, and hexamethylene groups, of which alkylene groups having one to four carbon atoms are preferred, and those having two or three carbon atoms are more preferred. The alkylene groups may be linear or branched. Among them, ethylene group and propylene group are preferred as alkylene groups as $R^5$ and $R^6$.

The repetition numbers "m" and "n" are not particularly limited as long as being integers of 0 or more. Typically, at least one of "m" and "n" may be an integer of about 0 to 20, and preferably 1 to 10. In many cases, one of "m" and "n" is 0, and the other is an integer of 1 or more (and preferably the other is 1). The repetition numbers "m" and "n" are not concurrently 0, namely, when "m" and "n" are both 0, the formula [—$(R^5O)_m(R^6O)_n$—H] represents a hydrogen atom.

X represents a divalent hydrocarbon group. Exemplary divalent hydrocarbon groups include alkylene groups, cycloalkylene groups, and arylene groups. The alkylene group as X may be linear or branched. It may also be saturated or unsaturated. Exemplary alkylene groups as X include alkylene groups having about one to six carbon atoms, such as methylene, ethylene, propylene, trimethylene, and tetramethylene groups, of which alkylene groups having one to four carbon atoms are preferred, and those having two or three carbon atoms are more preferred. Exemplary cycloalkylene groups include cycloalkylene groups having about five to twelve members ring, such as 1,2-cyclohexylene group, 1,3-cyclohexylene group, and 1,4-cyclohexylene group. Exemplary arylene groups include 1,2-phenylene group, 1,3-phenylene group, and 1,4-phenylene group.

The repetition number "p" is not particularly limited, as long as being an integer of 1 or more, but may be an integer of about 1 to 10, and is preferably an integer of 1 to 6, and more preferably an integer of 1 to 4.

More specifically, exemplary amine compounds represented by Formula (I) include N,N,N',N'-tetrakis(2-hydroxyethyl)ethylenediamine, N,N,N',N'-tetrakis(2-hydroxypropyl)ethylenediamine, N,N,N',N'-tetrakis(2-hydroxyethyl)trimethylenediamine, and N,N,N',N'-tetrakis(2-hydroxypropyl)trimethylenediamine; as well as polyoxyalkylene condensates of alkylenediamines, such as polyoxyethylene condensates of ethylenediamine, polyoxypropylene condensates of ethylenediamine, and polyoxyethylene-polyoxypropylene condensates of ethylenediamine. Exemplary amine compounds further include commercially available products, such as those under the trade names of "EDP-300", "EDP-450", "EDP-1100", and "Pluronic" supplied by ADEKA CORPORATION.

The amount of amine compounds containing two or more hydroxyl groups is preferably 0.01 to 5.0 parts by weight, and more preferably 0.05 to 1.0 parts by weight, typically to 100 parts by weight of the acrylic polymer, from the viewpoint of accelerating the crosslinking reaction to improve the productivity.

The pressure-sensitive adhesive compositions may further contain other crosslinking promoters than those mentioned above, for accelerating the crosslinking reaction. Exemplary crosslinking promoters include amino compounds such as N,N,N',N'-tetramethylhexanediamine and imidazole; amine compounds having two or more reactive functional groups other than hydroxyl groups; and organic metallic compounds such as cobalt naphthenate, dibutyltin diacetate, dibutyltin hydroxide, and dibutyltin laurate. Each of different crosslinking promoters may be used alone or in combination. The amount of crosslinking promoters is generally preferably 0.001 to 0.5 part by weight, and more preferably 0.001 to 0.3 part by weight, typically to 100 parts by weight of the acrylic polymer.

The pressure-sensitive adhesive compositions may further contain, where necessary, common additives such as ultraviolet-absorbers, photostabilizers, age inhibitors, release regulators, tackifiers, plasticizers, softeners, fillers, colorants including pigments and dyestuffs, and surfactants.

The pressure-sensitive adhesive compositions may be prepared, for example, by mixing an acrylic polymer and a crosslinking agent, where necessary with a nitrogen-containing hydroxy compound typified by an amine compound containing two or more hydroxyl groups, other crosslinking promoters, and other additives.

The gel fraction of a pressure-sensitive adhesive having a crosslinking structure (crosslinked pressure-sensitive adhesive) derived from a composition according to an embodiment of the present invention is preferably 40% to 80%, and more preferably 50% to 70%, for providing well-balanced resistance to blistering/separation. The gel fraction may be determined as an insoluble content in ethyl acetate. Specifically, it may be determined as a weight fraction (percent by weight) of insoluble components when a sample is immersed in ethyl acetate at 23° C. for 7 days, to the sample before immersion. The gel fraction may be controlled by adjusting the amount of crosslinking agents, the content of Component B, and the molecular weight of polymer components. A crosslinked pressure-sensitive adhesive having a gel fraction of less than 40% may often suffer form blistering; and one having a gel fraction of more than 80% may be liable to suffer from "lifting" and "separation" from the adherend.

Specifically, the gel fraction (solvent-insoluble content) is determined, for example, according to the following "technique for measuring gel fraction".

Technique for Measuring Gel Fraction

About 0.1 g of a pressure-sensitive adhesive having a crosslinking structure (crosslinked pressure-sensitive adhesive) is sampled, covered by a porous tetrafluoroethylene sheet having an average pore size of 0.2 µm (supplied by Nitto Denko Corporation under the trade name of "NTF 1122"), tied with a kite string, the weight of the resulting article is measured, and this weight is defined as a "weight before immersion". The "weight before immersion" is the total weight of the pressure-sensitive adhesive, the tetrafluoroethylene sheet, and the kite string. Separately, the total weight of the tetrafluoroethylene sheet and the kite string is measured as a tare weight.

Next, the pressure-sensitive adhesive covered by the tetrafluoroethylene sheet and tied with the kite stirring (hereinafter also referred to as "sample") is placed in a 50-ml vessel filled with ethyl acetate and left stand at 23° C. for 7 days. The sample after immersion in ethyl acetate is retrieved from the vessel, transferred into an aluminum cup, dried in a drier at 130° C. for 2 hours to remove ethyl acetate, and the weight of the resulting sample is measured as a weight after immersion.

A gel fraction is then calculated according to the following equation:

$$\text{Gel fraction (percent by weight)} = (A-B)/(C-B) \times 100 \qquad (1)$$

wherein "A" represents the weight after immersion; "B" represents the tare weight; and "C" represents the weight before immersion.

Typically, the gel fraction of a crosslinked pressure-sensitive adhesive obtained by crosslinking a pressure-sensitive adhesive composition at 23° C. for 168 hours preferably falls within the above-specified range. In some uses, the gel fraction of a crosslinked pressure-sensitive adhesive obtained by crosslinking a pressure-sensitive adhesive composition at 50° C. for 72 hours preferably falls within the above-specified range.

As has been described above, known pressure-sensitive adhesives (pressure-sensitive adhesive compositions) generally employ alkyl (meth)acrylates as main monomer components. Acrylic polymers formed from these pressure-sensitive adhesive compositions, however, have insufficient storage elastic moduli at high temperatures and show insufficient resistance to blistering/separation under conditions at high temperatures and/or high humidity. To improve these properties, there have been attempted to elevate the glass transition temperature (Tg) of an entire system of a pressure-sensitive adhesive (acrylic polymer) by copolymerizing with a monomer having a high glass transition temperature (Tg) or a functional-containing monomer (a carboxyl-containing monomer such as acrylic acid) or by adding an oligomer (low-molecular-weight polymer) or to increase the molecular weight of the acrylic polymer. However, a pressure-sensitive adhesive having a high glass transition temperature (Tg) as the entire system has a high storage elastic modulus at room temperature, and the adhesive is likely to bear blisters upon application (affixation) or has insufficient properties at low temperatures or at high speed. On the other hand, one having a high molecular weight has a high viscosity, and this may impair coatability and productivity. In particular, when a pressure-sensitive adhesive contains a carboxyl-containing monomer, such as acrylic acid, as a monomer component for the above purpose or for improving adhesiveness and cohesiveness, it shows insufficient anticorrosive properties with respect to thin metal films (including thin metal oxide films) as adherends. Specifically, it is difficult for the known pressure-sensitive adhesives to have all characteristic properties, such as resistance to blistering/separation, anticorrosive properties, and low-temperature properties (adhesive properties at low temperatures), at high levels.

In contrast, according to embodiments of the present invention, there are provided pressure-sensitive adhesives showing both satisfactory adhesiveness at low temperatures and high temperatures and anticorrosive properties while having satisfactory resistance to blistering/separation. These are provided by using alkoxyalkyl acrylates having appropriate polarity as main monomer components of the pressure-sensitive adhesives without using carboxyl-containing monomers as monomer components, and by suitably regulating the monomer composition, molecular weight, and degree of crosslinking of the pressure-sensitive adhesives. The compositions further give acrylic polymers that are free typically from excessively increased viscosities due to excessively strong hydrogen bonds, in contrast to copolymers of alkoxyalkyl acrylates with carboxyl-containing monomers. The acrylic polymers also have appropriate molecular weights and the compositions can be coated satisfactorily.

The way how an acrylic polymer constituting an pressure-sensitive adhesive composition according to an embodiment of the present invention exhibits its advantages has not yet been clarified, but it is supposed as follows. The acrylic polymer has a relatively low glass transition temperature (Tg), because it contains an alkoxyalkyl acrylate (Component A) as a main monomer component. In addition, when the pressure-sensitive adhesive composition is subjected to crosslinking to have a higher molecular weight, the resulting polymer can maintain a satisfactory storage elastic modulus even at high temperatures. This is because the alkoxy moiety of the alkoxyalkyl acrylate and the acrylic polymer having a specific molecular weight as specified above exhibit appropriate interactions and enhance entanglement of polymer chains in the resulting polymer, and such entangled polymer chains become resistant to disentanglement even at high temperatures. Accordingly, the polymer (pressure-sensitive adhesive) can maintain a high storage elastic modulus at high temperatures even though having a relatively low glass transition temperature (Tg) and a relatively low molecular weight, and can show satisfactory resistance to blistering/separation at high temperatures while having satisfactory coatability and adhesiveness at low temperatures and at high speed.

Additionally, the acrylic polymer constituting the pressure-sensitive adhesive composition contains substantially no carboxyl-containing monomers as monomer components, thereby does not cause an increased electric resistance of a thin metal film (inclusive of thin metal oxide film such as ITO film), due to an acid component. The composition is thereby advantageously usable typically in uses to stack ITO films. The mechanism to increase the electric resistance has not yet been clarified, but it is supposed that a residual carboxyl-containing monomer remained as a monomer even after polymerization and a polymer having such a low molecular weight as to be dissolved in water are dissolved in water under conditions at high temperatures and/or high humidity, and these dissolved components in water migrate into the ITO film to impede electric conduction.

Additionally, the acrylic polymer constituting the pressure-sensitive adhesive composition contains a specific amount of a monomer having a crosslinkable functional group such as hydroxyl group (Component B), is crosslinkable by the action of the crosslinking agent, and will have an appropriate degree of crosslinking. This acts to prevent blistering and separation at high temperatures.

A pressure-sensitive adhesive composition according to another embodiment of the present invention employs an aliphatic isocyanate crosslinking agent as the crosslinking agent and further contains an amine compound containing two or more hydroxyl groups. The pressure-sensitive adhesive composition thereby shows satisfactory yellowing resistance, productivity, and appearance at high levels.

[Pressure-Sensitive Adhesive Article]

A pressure-sensitive adhesive composition according to an embodiment of the present invention is applied to a substrate or release liner to form a pressure-sensitive adhesive layer thereon to thereby give a pressure-sensitive adhesive article. Exemplary pressure-sensitive adhesive articles include pressure-sensitive adhesive sheets and pressure-sensitive adhesive tapes. Such pressure-sensitive adhesive articles may be in the form of a sheet or tape with no substrate (transfer sheet or tape) which includes a release liner and arranged thereon a pressure-sensitive adhesive layer derived from the pressure-sensitive adhesive composition, or in the form of a sheet or tape which includes a substrate and, on one or both sides thereof, a pressure-sensitive adhesive layer derived from the pressure-sensitive adhesive composition.

The thickness of the pressure-sensitive adhesive layer (the thickness after applying and drying the pressure-sensitive adhesive composition) is not particularly limited, but is, for example, preferably 5 to 1000 μm, and more preferably 10 to 100 μm. The pressure-sensitive adhesive layer may have a single-layer structure or a multilayer structure.

The gel fraction of the pressure-sensitive adhesive layer (crosslinked pressure-sensitive adhesive) is preferably 40% to 80%, and more preferably 50% to 70%, from the viewpoint of providing well-balanced resistance to blistering/separation, as is described above.

A substrate to bear the pressure-sensitive adhesive layer is not particularly limited, and exemplary substrates include plastic films and optical films such as antireflective (AR) films, sheet polarizers, and retardation films. Exemplary materials for the substrates such as plastics films include plastic materials including polyesters such as poly(ethylene terephthalate)s (PETs); acrylic resins such as poly(methyl methacrylate)s (PMMAs); polycarbonates; triacetylcellulose; polysulfones; polyarylates; the product under the trade name of "ARTON (a cyclic olefin polymer; supplied by JSR)" and the product under the trade name of "ZEONOR (a cyclic olefin polymer; supplied by ZEON CORPORATION)". Each of different plastic materials may be used alone or in combination. The thickness of the substrate is not particularly limited, but is preferably, for example, 10 to 1000 μm. The substrate may have a single-layer structure or a multilayer structure. The substrate may have been subjected to a suitable known or common surface treatment. Exemplary surface treatments include physical treatments such as corona discharge treatment and plasma treatment; and chemical treatments such as primer coating.

The application of the pressure-sensitive adhesive compositions to give the pressure-sensitive adhesive article may be carried out according to a known coating procedure with a common coater. Exemplary coaters include gravure roll coaters, reverse roll coaters, kiss-roll coaters, dip roll coaters, bar coaters, knife coaters, and spray coaters.

The pressure-sensitive adhesive layer in the pressure-sensitive adhesive article, if used in optical articles such as displays, preferably has high transparency. Typically, the layer has a total luminous transmittance in visible ray regions of preferably 90% or more, and more preferably 91% or more, when determined according to Japanese Industrial Standards (JIS) K 7361. The pressure-sensitive adhesive layer in the pressure-sensitive adhesive article has a haze of, for example, preferably less than 1.0%, and more preferably less than 0.8%, when determined according to JIS K 7136. The total luminous transmittance and haze may be measured, for example, by laminating a sample layer with a slide glass (e.g., one having a total luminous transmittance of 91.8% and a haze of 0.4%) to give a test piece and carrying out measurements with a haze meter (supplied by Murakami Color Research Laboratory, under the trade name of "HM-150").

Exemplary adherends for the pressure-sensitive adhesive articles (such as pressure-sensitive adhesive sheets and pressure-sensitive adhesive tapes) include, but are not limited to, acrylic resin sheets, polycarbonate sheets, glass, and poly(ethylene terephthalate)s.

The pressure-sensitive adhesive articles are advantageously used in displays such as plasma display panels (PDP), touch panels, and liquid crystal panels. They are particularly advantageously used in uses where the articles are directly affixed to thin metal films such as of touch panels, because they have satisfactory anticorrosive properties, transparency, and adhesive properties.

EXAMPLES

The present invention will be illustrated in further detail with reference to several examples below. It should be noted, however, these are illustrated only by way of example and never construed to limit the scope of the present invention.

Preparation Example 1 of Acrylic Polymers

Acrylic Polymer A

In a separable flask were placed 70 parts by weight of 2-methoxyethyl acrylate, 29 parts by weight of 2-ethylhexyl acrylate, and 1 part by weight of 4-hydroxybutyl acrylate as monomer components; 0.2 part by weight of 2,2'-azobisisobutyronitrile as a polymerization initiator; and 100 parts by weight of ethyl acetate as a polymerization solvent. The mixture was stirred for 1 hour while introducing nitrogen gas thereinto. After removing oxygen therefrom in this manner, the polymerization system was heated at 63° C. to carry out a reaction for 10 hours, and the reaction mixture was combined with toluene to give an acrylic polymer solution (hereinafter also referred to as "Acrylic Polymer Solution A") having a solid content of 25 percent by weight. An acrylic polymer in Acrylic Polymer Solution A (hereinafter also referred to as "Acrylic Polymer A") had a weight-average molecular weight of $150 \times 10^4$.

Acrylic Polymers B to K

A series of acrylic polymer solutions (hereinafter also referred to as "Acrylic Polymer Solutions B to K") was prepared by the above procedure, except for changing the types and amounts of monomer components, and the amount of the solvent (ethyl acetate) as in Table 1. Acrylic polymers in Acrylic Polymer Solutions B to K (hereinafter also referred to as "Acrylic Polymers B to K") had weight-average molecular weights as shown in Table 1.

Example 1

A pressure-sensitive adhesive composition (solution) was prepared by mixing, in terms of solids content, 100 parts by weight of Acrylic Polymer Solution A (i.e., 100 parts by weight of Acrylic Polymer A) with 0.3 part by weight of a polyfunctional isocyanate compound (supplied by Nippon Polyurethane Industry Co., Ltd. under the trade name of "Coronate L") as a crosslinking agent.

The prepared solution was cast onto a release-treated surface (surface which had been subjected to a release treatment) of a poly(ethylene terephthalate) (PET) film (38 μm thick) as a release liner to a thickness after drying of about 25 μm, heated and dried at 130° C. for 3 minutes, further aged at 50° C. for 72 hours, and thereby yielded a pressure-sensitive adhesive sheet of substrate-less type.

Examples 2 to 8 and Comparative Examples 1 to 5

Pressure-sensitive adhesive compositions and pressure-sensitive adhesive sheets were prepared by the procedure of Example 1, except for changing the type of the acrylic polymer solution and the amount of the crosslinking agent as in Table 2.

[Evaluations]

For the pressure-sensitive adhesive compositions and pressure-sensitive adhesive sheets prepared in Examples 1 to 8 and Comparative Examples 1 to 5, the coatability, transparency, adhesiveness (adhesive properties at low temperatures), resistance to blistering/separation, and anticorrosive properties were measured or evaluated according to the following techniques. The results are shown in Table 2. The gel fractions in Table 2 are gel fractions of pressure-sensitive adhesives sampled from the pressure-sensitive adhesive sheets.

(1) Transparency: Total Luminous Transmittance and Haze

Each of the pressure-sensitive adhesive sheets prepared in Examples and Comparative Examples was laminated on a slide glass (supplied by Matsunami Glass Ind., Ltd. under the trade name of "S-1111", having a total luminous transmittance of 91.8% and a haze of 0.4%), from which the PET film was removed, to give a test piece having a layer structure of (pressure-sensitive adhesive layer)/(slide glass), and a haze (%) of the test piece was measured with a haze meter (supplied by Murakami Color Research Laboratory under the trade name of "HM-150"). The haze (%) was determined according to the equation: Haze (%)=(Diffused transmittance)/(Total luminous transmittance)×100.

A sample having a haze of less than 1.0% was evaluated as having good transparency ("Good"), and one having a haze of 1.0% or more was evaluated as having poor transparency ("Poor")

(2) Coatability

Each of the pressure-sensitive adhesive solutions (pressure-sensitive adhesive compositions) prepared in Examples and Comparative Examples was cast onto a release-treated surface of a PET film as a release liner at a coating speed of 1 to 10 m/minutes and thereby yielded a pressure-sensitive adhesive sheet. In this procedure, a sample having a smooth coated surface without coating streaks was evaluated as having good coatability ("Good"), and one having an uneven surface typically with coating streaks was evaluated as having poor coatability ("Poor"). The evaluation was conducted by visual observation.

(3) Anticorrosive Properties

Each of the pressure-sensitive adhesive sheets prepared in Examples and Comparative Examples was affixed to a PET film (supplied by Toray Industries, Inc. under the trade name of "Lumirror S-10 #25", 25 μm thick), cut into a size of 20 mm wide and 50 mm long, and thereby yielded a test piece.

With reference to FIG. 1, a silver paste was applied in a 15 mm wide to both ends of an electroconductive PET film (supplied by Nitto Denko Corporation under the trade name of "ELECRYSTA P400L-TNMP") (70 mm long and 25 mm wide) bearing an ITO film on one side thereof (ITO film-bearing surface 2), and the pressure-sensitive adhesive face of the test piece 1 after removing the release liner was affixed to the electroconductive surface (ITO film-bearing surface) 2 of the PET film. This was left stand under conditions at 60° C. and 95% relative humidity and at 80° C., respectively, for 250 hours, and changes (%) in resistivity as compared to that immediately after the affixation were measured. The resistivity was measured by attaching electrodes to silver paste-bearing portions 3 at both ends and carrying out measurement with the "m-ohm HiTESTER 3540" supplied by HIOKI E. E. CORPORATION.

A sample having a change in resistivity of less than 120% was evaluated as having good anticorrosive properties ("Good"), and one having a change in resistivity of 120% or more was evaluated as having poor anticorrosive properties ("Poor").

As a blank sample, the electroconductive PET film without the pressure-sensitive adhesive sheet was subjected to a test in the same manner and was found to have a change in resistivity of 110% when left stand at 80° C. and of 120% when left stand at 60° C. and 95% relative humidity.

(4) Resistance to Blistering/Separation

Each of the pressure-sensitive adhesive sheets prepared in Examples and Comparative Examples was laminated to a PET film (supplied by Toyobo Co., Ltd. under the trade name of "A4300", 125 μm thick) to give a film piece 100 mm wide and 100 mm long.

After removing the release liner therefrom, the film piece was affixed to a polycarbonate (PC) sheet (supplied by Teijin Chemicals Inc. under the trade name of "Panlite PC1111", 1 mm thick) to give a sample piece having a layer structure of (PET film)/(pressure-sensitive adhesive layer)/(PC sheet).

The sample piece was subjected to a heat treatment (thermal stability test) in an oven at 80° C. for 5 hours. The sample piece after the thermal stability test was visually observed at a bonding interface (interface between the pressure-sensitive adhesive layer and the PC sheet). A sample piece showing neither "blisters (bubbles)" nor "lifting" was evaluated as having good resistance to blistering/separation ("Good"), and one showing "blisters" and/or "lifting" even slightly was evaluated as having poor resistance to blistering/separation ("Poor").

(5) Adhesive Properties at Low Temperatures

Figure 2A:
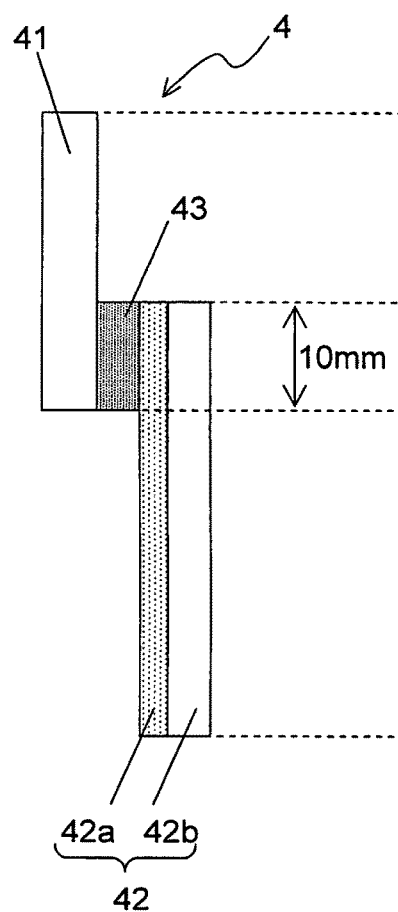
FIGS. 2A and 2B are a schematic cross-sectional view and a schematic front view, respectively, of a test sample for use in determination of adhesive properties at low temperatures.
Figure 2B:
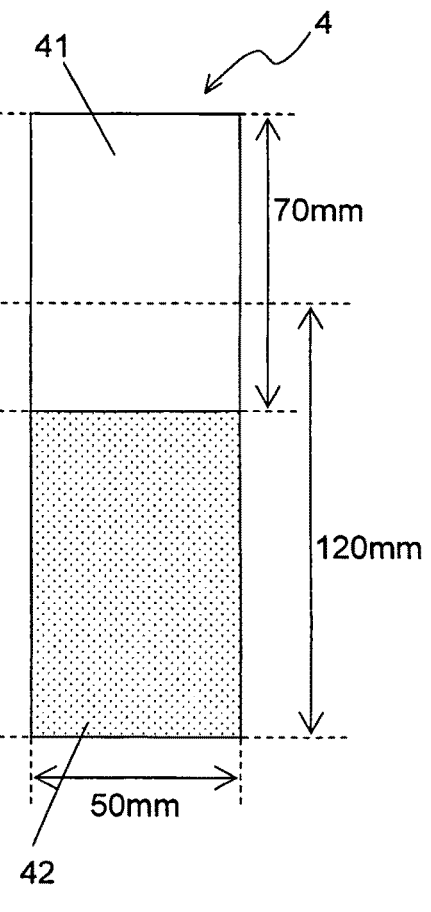

With reference to FIG. 2, a test sample 4 was made by affixing an acrylic sheet 41 (70 mm long, 50 mm wide, and 2.0 mm thick) (supplied by Mitsubishi Rayon Co., Ltd. under the trade name of "ACRYLITE") and an acrylic sheet 42 (120 mm long and 50 mm wide) through a pressure-sensitive adhesive sheet 43 (10 mm long and 50 mm wide; each of the pressure-sensitive adhesive sheets prepared in Examples and Comparative Examples). The acrylic sheet 42 included an acrylic sheet 42b and a PET film (supplied by Toyobo Co., Ltd. under the trade name of "A4300, #125") 42a laminated on one side thereof with an adhesive. The affixation (compression bonding) was conducted through one reciprocating motion of a 5-kg roller, in which the bonding area was 10 mm long and 50 mm wide.

The test sample was heated in an autoclave at 50° C. and 5 atmospheres for 30 minutes, aged at 50° C. under normal pressure for 24 hours, left stand at a measurement temperature (−30° C.) for 3 hours, and then subjected to measurement.

Figure 3:
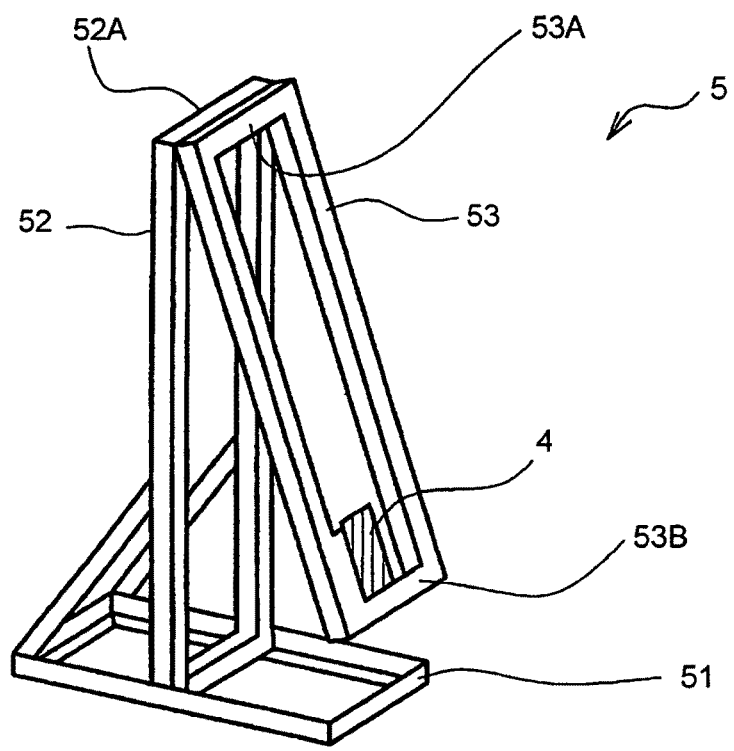
FIG. 3 is a schematic view of a testing unit for use in a test on adhesive properties at low temperatures.
Figure 4:
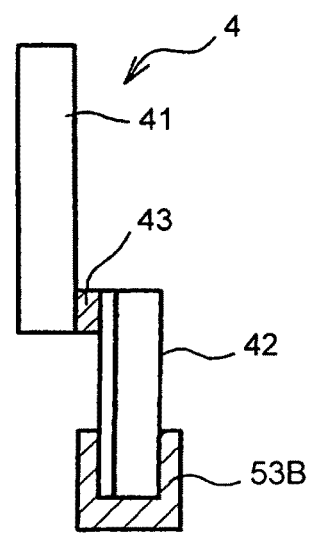
FIG. 4 is a schematic cross-sectional view of a sample holder of the testing unit in FIG. 3.
Figure 5:
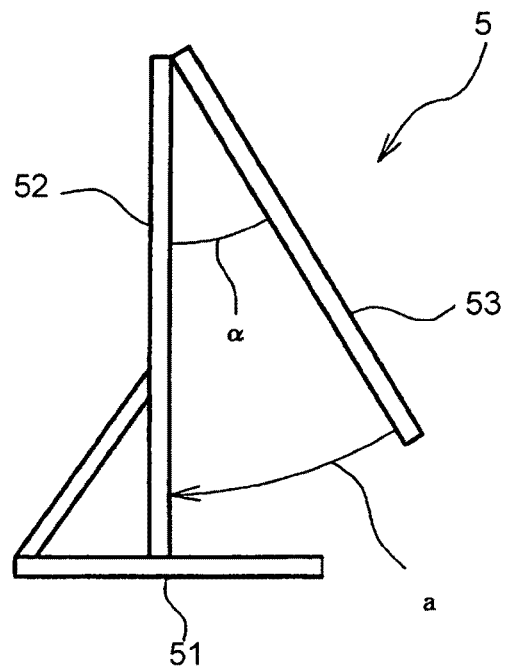
FIG. 5 is a schematic view (schematic side view of the testing unit) showing how the test on adhesive properties at low temperatures is conducted.

With reference to FIGS. 3 to 5, the test sample was set in an impact testing unit, and an impact test was conducted at −30° C. at angles (measurement angles) of from 10 degrees to 90 degrees in increments of 10 degrees, and the angle at which the acrylic sheet 41 was peeled off was determined. Details of the impact testing method and the testing unit are as follows.

[Impact Testing Unit and Testing Method]

(i) Testing Unit

FIG. 3 depicts a schematic view of a testing unit. The testing unit 5 includes a first angle 51; a second angle 52 arranged in a vertical direction to the first angle 51; and a third angle 53. An upper end flame 53A of the third angle 53 is hinge-mounted to an upper end flame 52A of the second angle 52 so that the third angle 53 is rotatable with respect to the second angle 52. The first angle 51 is composed of a rectangular frame (610 mm in long side and 322 mm in short side) made of stainless steel plates each having a wall thickness of 6 mm and having an L-shaped cross section (50 mm in both sides of the L-shape). The second angle 52 is composed of a rectangular frame (1010 mm in long side and 322 mm in short side) made of stainless steel plates each having a wall thickness of 3 mm and having an L-shaped cross section (25 mm in both sides of the L-shape). The third angle 53 has a total weight of 3.3 kg and is composed of a rectangular frame (915 mm in long side and 310 mm in short side) made of stainless steel plates each having a wall thickness of 3 mm and having an L-shaped cross section (25 mm in both sides of the L-shape).

With reference to FIG. 4, a lower end flame 53B of the third angle 53 has a U-shaped cross section to constitute a sample holder and thereby holds the test sample 4 (holds the acrylic sheet 42 in a portion 20 mm higher from the lower end thereof).

(ii) Testing Method

With reference to FIG. 5, in an environment of −30° C., the third angle 53 was lifted by hand so as to make a predetermined angle (a) with the second angle 52 and then let go to come into collision with the second angle 52 (the third angle 53 was allowed to move as indicated by the arrow "a"). This procedure was repeated at a varying angle (α).

Figure 6:
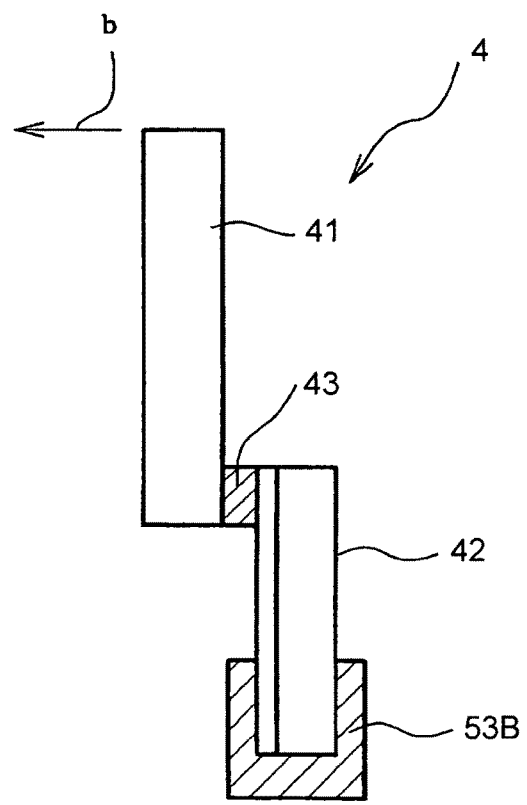
FIG. 6 is a schematic view showing how force is applied on the test sample in the test on adhesive properties at low temperatures.

With reference to FIG. 6, the collision applies force (inertial force) to the acrylic sheet 41 in a direction indicated by the arrow "b" in FIG. 6. In the test, the angle at which the acrylic sheet 41 was peeled off from the acrylic sheet 42 by the action of the force was determined.

In the measurement, the angle (α) (measurement angle) was varied from 10 degrees to 90 degrees in increments of 10 degrees.

TABLE 1

|  |  |  | Acrylic Polymer A | Acrylic Polymer B | Acrylic Polymer C | Acrylic Polymer D | Acrylic Polymer E | Acrylic Polymer F | Acrylic Polymer G | Acrylic Polymer H | Acrylic Polymer I | Acrylic Polymer J | Acrylic Polymer K |
|---|---|---|---|---|---|---|---|---|---|---|---|---|---|
| Monomer composition | Component A (alkoxyalkyl acrylate) | Monomer type | MEA | MEA | MEA | MEA | MEA | MEA | MEA | MEA | MEA | — | MEA |
|  |  | Amount (part by weight) | 70 | 99 | 50 | 99 | 99 | 50 | 40 | 70 | 99 | — | 99 |
|  | Component B (functional-group-containing monomer) | Monomer type | 4HBA | 4HBA | 4HBA | 4HBA | 2HEA | 2HEA | 4HBA | — | 4HBA | 4HBA | 4HBA |
|  |  | Amount (part by weight) | 1 | 1 | 1 | 1 | 1 | — | 1 | 1 | 1 | — | — |
|  | Carboxyl-containing monomer | Monomer type | — | — | — | — | — | — | — | AA | — | — | — |
|  |  | Amount (part by weight) | — | — | — | — | — | — | — | 1 | — | — | — |
|  | Other monomer | Monomer type | 2EHA | — | 2EHA | — | — | 2EHA | 2EHA | 2EHA | — | 2EHA | — |
|  |  | Amount (part by weight) | 29 | — | 49 | — | — | 49 | 59 | 29 | — | 99 | — |
| Amount of polymerization solvent (ethyl acetate) (part by weight) |  |  | 100 | 100 | 100 | 233.3 | 150 | 100 | 100 | 233.3 | 400 | 100 | 67 |
| Solid content of acrylic polymer solution (percent by weight) |  |  | 25 | 25 | 25 | 25 | 25 | 25 | 25 | 25 | 20 | 25 | 25 |
| Weight-average molecular weight of acrylic polymer |  |  | $150 \times 10^4$ | $150 \times 10^4$ | $150 \times 10^4$ | $60 \times 10^4$ | $100 \times 10^4$ | $150 \times 10^4$ | $150 \times 10^4$ | $70 \times 10^4$ | $30 \times 10^4$ | $150 \times 10^4$ | $180 \times 10^4$ |

*The amounts are charging amounts (part by weight) upon preparation of polymers.
MEA: 2-Methoxyethyl acrylate
4HBA: 4-Hydroxybutyl acrylate
2HEA: 2-Hydroxyethyl acrylate
AA: Acrylic acid
2EHA: 2-Ethylhexyl acrylate

TABLE 2

|  |  | Ex. 1 | Ex. 2 | Ex. 3 | Ex. 4 | Ex. 5 | Ex. 6 | Ex. 7 | Ex. 8 | Com. Ex. 1 | Com. Ex. 2 | Com. Ex. 3 | Com. Ex. 4 | Com. Ex. 5 |
|---|---|---|---|---|---|---|---|---|---|---|---|---|---|---|
| Acrylic polymer | Type | A | B | C | D | E | B | B | F | G | H | I | J | K |
|  | Amount (part by weight) | 100 | 100 | 100 | 100 | 100 | 100 | 100 | 100 | 100 | 100 | 100 | 100 | 100 |
| Crosslinking agent | Type | CR-L | CR-L | CR-L | CR-L | CR-L | CR-L | CR-L | CR-L | CR-L | CR-L | CR-L | CR-L | CR-L |
|  | Amount (part by weight) | 0.3 | 0.3 | 0.3 | 0.75 | 0.45 | 0.25 | 0.4 | 0.3 | 0.3 | 0.6 | 1.5 | 0.3 | 0.2 |
| Pressure-sensitive adhesive | Gel fraction (%) | 60 | 60 | 60 | 60 | 60 | 40 | 80 | 60 | 60 | 60 | 60 | 60 | 60 |
| Evaluation | Resistance to blistering/separation | Good | Good | Good | Good | Good | Good | Good | Good | Poor (blister) | Good | Poor (blister) | Poor (blister) | Good |
|  | Anti-corrosive properties (80° C.) | Good (95%) | Good (95%) | Good (95%) | Good (95%) | Good (95%) | Good (95%) | Good (95%) | Good (95%) | Good (95%) | Good (95%) | Good (95%) | Good (95%) | Good (95%) |
|  | Anti-corrosive properties (60° C., 95% RH) | Good (100%) | Good (100%) | Good (100%) | Good (100%) | Good (100%) | Good (100%) | Good (100%) | Good (100%) | Good (100%) | Poor (135%) | Good (100%) | Good (100%) | Good (100%) |
|  | Coatability | Good | Good | Good | Good | Good | Good | Good | Good | Good | Poor (streak) | Good | Good | Poor (streak) |

*The amounts are parts by weight in terms of solids content.
CR-L: "Coronate L" supplied by Nippon Polyurethane Industry Co., Ltd.

Tables 1 and 2 demonstrate that the pressure-sensitive adhesive compositions according to embodiments of the present invention (Examples 1 to 8) excel in coatability, and the pressure-sensitive adhesive layers and pressure-sensitive adhesive sheets obtained therefrom do not suffer from "blisters" and "lifting" even at high temperatures and excel in resistance to blistering/separation. Additionally, they do not corrode an adherend even when they are affixed to an electroconductive film as the adherend and stored under conditions at high temperatures or under conditions at high temperatures and high humidity over extended periods of time.

The pressure-sensitive adhesive sheets according to Examples 1, 3, and 8 showed no separation of the acrylic sheet even at a measurement angle of 90 degrees in the tests for adhesive properties at low temperatures (impact tests) and showed excellent adhesive properties at low temperatures. Those according to Examples 2 and 4 to 7 showed separation of the acrylic sheet at a measurement angle of 50 degrees and had good adhesive properties at low temperatures. All the pressure-sensitive adhesive sheets according to Examples 1 to 8 had good transparency ("Good").

In contrast, the samples containing an excessively small amount of an alkoxyalkyl acrylate as Component A (Comparative Examples 1 and 4) or containing an acrylic polymer having an excessively small molecular weight (Comparative Example 3) showed poor resistance to blistering/separation. The sample containing an acrylic polymer having an excessively large molecular weight (Comparative Example 5) showed poor coatability. The sample containing acrylic acid (carboxyl-containing monomer) as a monomer component (Comparative Example 2) corroded the adherend when stored in an environment of high temperatures and/or high humidity over an extended period of time.

Next, advantages (improvements) of use of an amine compound containing two or more hydroxyl groups as an aliphatic isocyanate crosslinking agent on yellowing resistance and productivity will be illustrated with reference to examples below, which are by no means construed to limit the scope of the present invention.

Preparation Example 2 of Acrylic Polymers

Acrylic Polymer L

Predetermined amounts of monomer components and ethyl acetate as a polymerization solvent as in Table 3 were placed in a separable flask, and the mixture was stirred for 1 hour while introducing nitrogen gas thereinto. After removing oxygen therefrom in this manner, the polymerization system was heated to 63° C., combined with 0.2 part by weight of 2,2'-azobisisobutyronitrile as a polymerization initiator, reacted for 10 hours, combined with MEK (methyl ethyl ketone), and thereby yielded an acrylic polymer solution having a solid content of 25 percent by weight (hereinafter also referred to as "Acrylic Polymer Solution L").

Acrylic Polymers M to T

A series of acrylic polymer solutions (hereinafter also referred to as "Acrylic Polymer Solutions M to T") was prepared by the above procedure, except for changing the types and amounts of monomer components, and the amount of the solvent (ethyl acetate) as in Table 3.

Acrylic polymers in Acrylic Polymer Solutions L to T (hereinafter also referred to as "Acrylic Polymers L to T") had weight-average molecular weights as shown in Table 3.

Example 9

A pressure-sensitive adhesive composition (solution) was prepared by mixing, in terms of solids content, 100 parts by weight of Acrylic Polymer Solution L (i.e., 100 parts by weight of Acrylic Polymer L) with 0.7 part by weight of an aliphatic polyfunctional isocyanate compound (supplied by Nippon Polyurethane Industry Co., Ltd. under the trade name of "Coronate HL") as a crosslinking agent and 0.3 part by weight of a polyol as an adduct of ethylenediamine with propylene oxide (supplied by ADEKA CORPORATION under the trade name of "EDP-300") as a coagent.

The prepared solution was cast onto a release-treated surface (surface which had been subjected to a release treatment) of a poly(ethylene terephthalate) (PET) film (38 μm thick) as a release liner to a thickness after drying of about 25 μm, heated and dried at 130° C. for 3 minutes, further aged at 23° C. for 7 days, and thereby yielded a pressure-sensitive adhesive sheet of substrate-less type.

Examples 10 to 23 and Comparative Examples 6 to 10

Pressure-sensitive adhesive compositions and pressure-sensitive adhesive sheets were prepared by the procedure of Example 9, except for changing the type of the acrylic polymer solution and the types and amounts of the crosslinking agent and coagent as in Tables 4 and 5.

[Evaluations]

For the pressure-sensitive adhesive compositions and pressure-sensitive adhesive sheets prepared in Examples 9 to 23 and Comparative Examples 6 to 10, coatability, transparency, resistance to blistering/separation, anticorrosive properties, productivity (rise in degree of crosslinking), and yellowing resistance (b value after a long-term heat treatment) were determined.

The techniques for measuring or determining the transparency, coatability, anticorrosive properties, and resistance to blistering/separation are as with the techniques (1) to (4). The rise in degree of crosslinking and yellowing resistance were measured or determined according to the following techniques. The results are shown in Tables 4 and 5. The gel fractions in Tables 4 and 5 are gel fractions of pressure-sensitive adhesives sampled from the pressure-sensitive adhesive sheets.

(6) Rise in Degree of Crosslinking (Productivity)

Each of the pressure-sensitive adhesive compositions prepared in Examples and Comparative Examples was cast onto a release-treated surface (surface which had been subjected to a release treatment) of a poly(ethylene terephthalate) (PET) film to a thickness after drying of about 25 μm, and heated and dried at 130° C. for 3 minutes to give a pressure-sensitive adhesive layer. The pressure-sensitive adhesive layer was subjected to aging procedures under different conditions of 50° C. for 24 hours and 23° C. for 168 hours (7 days), respectively, and thereby yielded pressure-sensitive adhesive samples (crosslinked pressure-sensitive adhesives).

About 0.1 g of each of the pressure-sensitive adhesive samples (crosslinked pressure-sensitive adhesives) after the aging procedures under the different conditions (50° C. for 24 hours or 23° C. for 168 hours) was sampled, and the gel fraction (percent by weight) was determined according to the "Technique for Measuring Gel Fraction".

The "rise in degree of crosslinking (%)" was calculated from the gel fraction of a pressure-sensitive adhesive sample aged at 50° C. for 24 hours (referred to as "gel fraction at 50° C. for 24 hours") and the gel fraction of a pressure-sensitive adhesive sample aged at 23° C. for 168 hours (referred to as "gel fraction at 23° C. for 168 hours") according to the following equation:

Rise in degree of crosslinking (%)=(Gel fraction at 23° C. for 168 hours)/(Gel fraction at 50° C. for 24 hours)×100

A sample having a higher rise in degree of crosslinking will be crosslinked more quickly at room temperature and have better productivity.

(7) Yellowing Resistance (b value after heat treatment at 80° C. for 500 hours and b value after heat treatment at 80° C. for 1000 hours)

Each of the samples (the pressure-sensitive adhesive sheets prepared in Examples and Comparative Examples) was subjected to heat treatments under different predetermined conditions (80° C. for 500 hours or 80° C. for 1000 hours), laminated to a slide glass (supplied by Matsunami Glass Ind., Ltd. under the trade name of "S-1111", having a total luminous transmittance of 91.8% and a haze of 0.4%), from which the PET film was removed to expose the pressure-sensitive adhesive layer, and its b value was determined according to the CIE 1976 color space (L*a*b* color space) with the spectrophotometer DOT-3C supplied by Murakami Color Research Laboratory.

TABLE 3

|  |  |  | Acrylic Polymer L | Acrylic Polymer M | Acrylic Polymer N | Acrylic Polymer O | Acrylic Polymer P | Acrylic Polymer Q | Acrylic Polymer R | Acrylic Polymer S | Acrylic Polymer T |
|---|---|---|---|---|---|---|---|---|---|---|---|
| Monomer composition | Component A (alkoxyalkyl acrylate) | Monomer type | MEA | MEA | MEA | MEA | MEA | MEA | MEA | — | MEA |
|  |  | Amount (part by weight) | 70 | 49 | 50 | 50 | 50 | 70 | 50 | — | 99 |
|  | Component B (functional-group-containing monomer) | Monomer type | 4HBA | 4HBA | 2HEA | 4HBA | — | — | 4HBA | 4HBA | 4HBA |
|  |  | Amount (part by weight) | 1 | 3 | 1 | 1 | — | — | 1 | 1 | 1 |
|  | Carboxyl-containing monomer | Monomer type | — | — | — | — | — | AA | — | — | — |
|  |  | Amount (part by weight) | — | — | — | — | — | 1 | — | — | — |
|  | Other monomer | Monomer type | 2EHA | 2EHA | 2EHA | BA | 2EHA | 2EHA | 2EHA | 2EHA | — |
|  |  | Amount (part by weight) | 29 | 48 | 49 | 49 | 50 | 29 | 49 | 99 | — |
| Amount of polymerization solvent (ethyl acetate) (part by weight) |  |  | 150 | 150 | 150 | 150 | 150 | 150 | 400 | 100 | 67 |
| Solid content of acrylic polymer solution (percent by weight) |  |  | 25 | 25 | 25 | 25 | 25 | 25 | 20 | 25 | 25 |
| Weight-average molecular weight of acrylic polymer |  |  | $100 \times 10^4$ | $100 \times 10^4$ | $100 \times 10^4$ | $100 \times 10^4$ | $100 \times 10^4$ | $100 \times 10^4$ | $30 \times 10^4$ | $150 \times 10^4$ | $180 \times 10^4$ |

*The amounts are charging amounts (part by weight) upon preparation of polymers.
MEA: 2-Methoxyethyl acrylate
4HBA: 4-Hydroxybutyl acrylate
2HEA: 2-Hydroxyethyl acrylate
AA: Acrylic acid
2EHA: 2-Ethylhexyl acrylate
BA: Butyl acrylate

TABLE 4

|  |  | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Acrylic polymer | Type | L | L | L | M | L | L | L | L |
|  | Amount (part by weight) | 100 | 100 | 100 | 100 | 100 | 100 | 100 | 100 |
| Crosslinking agent | Type | CR-HL | MFA-75X | 21S-75E | CR-HL | CR-HL | CR-HL | CR-HL | CR-HL |
|  | Amount (part by weight) | 0.7 | 0.3 | 0.4 | 0.4 | 0.6 | 0.8 | 0.7 | 0.7 |
| Coagent | Type | EDP-300 | EDP-300 | EDP-300 | EDP-300 | EDP-300 | EDP-300 | EDP-300 | EDP-300 |
|  | Amount (part by weight) | 0.3 | 0.1 | 0.1 | 0.3 | 0.3 | 0.3 | 0.1 | 0.5 |
| Pressure-sensitive adhesive Evaluation | Gel fraction (%) | 56 | 60 | 60 | 57 | 53 | 65 | 60 | 51 |
|  | Resistance to blistering/separation | Good | Good | Good | Good | Good | Good | Good | Good |
|  | Anticorrosive properties (80° C.) | Good (95%) | Good (95%) | Good (95%) | Good (95%) | Good (95%) | Good (95%) | Good (95%) | Good (95%) |
|  | Anticorrosive properties (60° C., 95% RH) | Good (100%) | Good (100%) | Good (100%) | Good (100%) | Good (100%) | Good (100%) | Good (100%) | Good (100%) |
|  | Yellowing resistance (b value after treatment at 80° C. for 500 hours) | 0.27 | 0.27 | 0.27 | 0.27 | 0.27 | 0.27 | 0.27 | 0.28 |
|  | Yellowing resistance (b value after treatment at 80° C. for 1000 hours) | 0.30 | 0.29 | 0.29 | 0.30 | 0.30 | 0.30 | 0.29 | 0.32 |
|  | Rise in degree of crosslinking (%) | 95 | 97 | 97 | 95 | 95 | 94 | 90 | 99 |
|  | Coatability | Good | Good | Good | Good | Good | Good | Good | Good |

|  |  | Ex. 17 | Ex. 18 | Ex. 19 | Ex. 20 | Ex. 21 | Ex. 22 | Ex. 23 |
|---|---|---|---|---|---|---|---|---|
| Acrylic polymer | Type | L | N | O | L | L | L | L |
|  | Amount (part by weight) | 100 | 100 | 100 | 100 | 100 | 100 | 100 |
| Crosslinking agent | Type | CR-HL | CR-HL | CR-HL | CR-HL | CR-L | CR-HL | CR-HL |
|  | Amount (part by weight) | 0.7 | 0.7 | 0.7 | 0.9 | 0.3 | 0.7 | 1 |
| Coagent | Type | EDP-450 | EDP-300 | EDP-300 | EDP-300 | — | — | EDP-300 |
|  | Amount (part by weight) | 0.2 | 0.1 | 0.1 | 0.3 | — | — | 5.5 |

TABLE 4-continued

| | | | | | | | | |
|---|---|---|---|---|---|---|---|---|
| Pressure-sensitive adhesive Evaluation | Gel fraction (%) | 57 | 60 | 60 | 72 | 60 | 60 | 60 |
| | Resistance to blistering/separation | Good | Good | Good | Good | Good | Good | Good |
| | Anticorrosive properties (80° C.) | Good (95%) | Good (95%) | Good (95%) | Good (95%) | Good (95%) | Good (95%) | Good (95%) |
| | Anticorrosive properties (60° C., 95% RH) | Good (100%) | Good (100%) | Good (100%) | Good (100%) | Good (100%) | Good (100%) | Good (100%) |
| | Yellowing resistance (b value after treatment at 80° C. for 500 hours) | 0.27 | 0.27 | 0.27 | 0.27 | 0.35 | 0.25 | 0.37 |
| | Yellowing resistance (b value after treatment at 80° C. for 1000 hours) | 0.30 | 0.30 | 0.30 | 0.30 | 0.50 | 0.27 | 0.51 |
| | Rise in degree of crosslinking (%) | 95 | 95 | 94 | 94 | 91 | 67 | 100 |
| | Coatability | Good | Good | Good | Good | Good | Good | Good |

*The amounts are parts by weight in terms of solids content.
CR-L: "Coronate L" supplied by Nippon Polyurethane Industry Co., Ltd. (aromatic isocyanate (tolylenediisocyanate) crosslinking agent)
CR-HL: "Coronate HL" supplied by Nippon Polyurethane Industry Co., Ltd. (aliphatic isocyanate (hexamethylene diisocyanate) crosslinking agent)
MFA-75X: "DURANATE MFA-75X" supplied by Asahi Kasei Chemicals Corporation (aliphatic isocyanate (hexamethylene diisocyanate) crosslinking agent)
21S-75E: "DURANATE 21S-75E" supplied by Asahi Kasei Chemicals Corporation (aliphatic isocyanate (hexamethylene diisocyanate) crosslinking agent)
EDP-300: "EDP-300" supplied by ADEKA CORPORATION
EDP-450: "EDP-450" supplied by ADEKA CORPORATION

TABLE 5

| | | Com. Ex. 6 | Com. Ex. 7 | Com. Ex. 8 | Com. Ex. 9 | Com. Ex. 10 |
|---|---|---|---|---|---|---|
| Acrylic polymer | Type | P | Q | R | T | S |
| | Amount (part by weight) | 100 | 100 | 100 | 100 | 100 |
| Crosslinking agent | Type | CR-HL | CR-HL | CR-HL | CR-HL | CR-HL |
| | Amount (part by weight) | 0.7 | 0.6 | 2 | 0.3 | 0.7 |
| Coagent | Type | EDP-300 | EDP-300 | EDP-300 | EDP-300 | EDP-300 |
| | Amount (part by weight) | 0.1 | 0.1 | 0.3 | 0.3 | 0.1 |
| Pressure-sensitive adhesive Evaluation | Gel fraction (%) | 0 | 60 | 60 | 60 | 60 |
| | Resistance to blistering/separation | Poor | Good | Poor | Good | Poor |
| | Anticorrosive properties (80° C.) | Good (95%) | Good (98%) | Good (95%) | Good (95%) | Good (95%) |
| | Anticorrosive properties (65° C., 95% RH) | Good (100%) | Poor (130%) | Good (100%) | Good (100%) | Good (100%) |
| | Yellowing resistance (b value after treatment at 80° C. for 500 hours) | 0.27 | 0.27 | 0.27 | 0.27 | 0.26 |
| | Yellowing resistance (b value after treatment at 80° C. for 1000 hours) | 0.30 | 0.30 | 0.32 | 0.32 | 0.30 |
| | Rise in degree of crosslinking (%) | — | 97 | 71 | 98 | 97 |
| | coatability | Good | Good | Good | Poor (streak) | Good |

*The amounts are parts by weight in terms of solids content.
CR-HL: "Coronate HL" supplied by Nippon Polyurethane Industry Co., Ltd. (aliphatic isocyanate (hexamethylene diisocyanate) crosslinking agent)
EDP-300: "EDP-300" supplied by ADEKA CORPORATION All the samples according to Examples 9 to 23 showed good transparency ("Good").

Tables 3 to 5 demonstrate that the pressure-sensitive adhesive compositions and pressure-sensitive adhesive sheets according to Examples 9 to 20 contain predetermined amounts of an aliphatic isocyanate crosslinking agent and an amine compound containing two or more hydroxyl groups as a coagent. They not only excel in coatability, resistance to blistering/separation, and anticorrosive properties, but also suffer from no yellowing even after heating over an extended period of time and excel in yellowing resistance. They show relatively rapidly increasing degrees of crosslinking even at a temperature of 23° C. and therefore excel in productivity.

In contrast, the samples using an aromatic isocyanate crosslinking agent or using an amine compound containing two or more hydroxyl groups as a coagent not in a suitable amount fail to have satisfactory yellowing resistance and good productivity in production without heating, although they excel in some characteristic properties such as coatability, resistance to blistering/separation, and anticorrosive properties. More specifically, they show somewhat remarkable yellowing or have a low rise in degree of crosslinking and are not satisfactorily crosslinked after aging at 23° C. for 168 hours (Examples 21 to 23).

In this connection, even when using both an aliphatic isocyanate crosslinking agent and an amine compound containing two or more hydroxyl groups as a coagent, in the samples according to Comparative Examples 6 to 10, Component A or Component B is not used as a monomer component, acrylic acid (carboxyl-containing monomer) is used, or an acrylic polymer has a molecular weight not in a suitable range. These samples thereby are unsatisfactory in coatability, resistance to blistering/separation, and/or anticorrosive properties, to fail to give the above-mentioned advantages.

While there have been described what are at present considered to be the preferred embodiments of the present invention, it should be understood by those skilled in the art that various modifications, combinations, subcombinations, and alterations may occur depending on design requirements and other factors insofar as they are within the spirit and scope of the appended claims or the equivalents thereof.

What is claimed is:

1. A pressure-sensitive adhesive composition comprising:
100 parts by weight of an acrylic polymer;
0.01 to 3.0 parts by weight of a crosslinking agent, and
0.01 to 5.0 parts by weight of an amine compound containing two or more hydroxyl groups,
wherein the acrylic polymer having a weight-average molecular weight of $40 \times 10^4$ to $160 \times 10^4$ and containing at least one alkoxyalkyl acrylate (Component A), at least one acrylic monomer having a crosslinkable functional group (Component B), and at least one alkyl (meth) acrylates whose alkyl moiety being one to twelve carbon atoms as essential monomer components;
the monomer components constituting the acrylic polymer contain 45 to 70 parts by weight of Component A, 0.5 to 4.5 parts by weight of Component B, and 29 to 49 parts by weight of alkyl (meth) acrylates whose alkyl moiety being one to twelve carbon atoms, to 100 parts by weight of total monomer components constituting the acrylic polymer;
the monomer components constituting the acrylic polymer contain substantially no carboxyl-containing monomers,
the crosslinking agent is an aliphatic isocyanate crosslinking agent, and
wherein the pressure-sensitive adhesive composition is free of blisters.

2. The pressure-sensitive adhesive composition according to claim 1, wherein Component B comprises a hydroxyl-containing acrylic monomer.

3. The pressure-sensitive adhesive composition according to claim 2, wherein a crosslinked product of the pressure-sensitive adhesive composition has a gel fraction of 40% to 80%.

4. A pressure-sensitive adhesive article which is applied with the pressure-sensitive adhesive composition of claim 3.

5. A pressure-sensitive adhesive article which is applied with the pressure-sensitive adhesive composition of claim 2.

6. A display using the pressure-sensitive adhesive article of claim 5.

7. The pressure-sensitive adhesive composition according to claim 1, wherein a crosslinked product of the pressure-sensitive adhesive composition has a gel fraction of 40% to 80%.

8. A pressure-sensitive adhesive article which is applied with the pressure-sensitive adhesive composition of claim 7.

9. A pressure-sensitive adhesive article which is applied with the pressure-sensitive adhesive composition of claim 1.

10. A display using the pressure-sensitive adhesive article of claim 9.

* * * * *